United States Patent [19]

Wieveg et al.

[11] 4,342,330
[45] Aug. 3, 1982

[54] BALL TYPE VALVE HAVING IMPROVED REDUNDANT SEALING SYSTEM

[75] Inventors: Raymond Wieveg, Los Angeles, Calif.; Julian D. Keithahn, Houston, Tex.

[73] Assignee: Hydril Company, Los Angeles, Calif.

[21] Appl. No.: 178,871

[22] Filed: Aug. 18, 1980

[51] Int. Cl.³ .......................... F16K 43/00; F16K 5/20
[52] U.S. Cl. ..................... 137/315; 251/174; 251/315; 251/316
[58] Field of Search .................. 137/315, 584; 251/174, 251/176, 180, 315, 316, 317, 148, 152

[56] References Cited

U.S. PATENT DOCUMENTS

| | | | |
|---|---|---|---|
| 3,036,590 | 5/1962 | Knox | 137/315 |
| 3,134,396 | 5/1964 | Bredtschneider | 137/315 |
| 3,157,190 | 11/1964 | Allen | 251/174 |
| 3,647,179 | 3/1972 | Scaramucci et al. | 251/315 |
| 3,771,545 | 11/1973 | Allen | 137/315 |
| 3,838,844 | 10/1974 | Arn | 251/174 |
| 4,262,691 | 4/1981 | Kacal | 137/315 |
| 4,266,566 | 5/1981 | Kacal et al. | 251/174 |

*Primary Examiner*—George L. Walton
*Attorney, Agent, or Firm*—John H. Dodge, II

[57] ABSTRACT

An improved ball-type valve apparatus adapted for use in flowlines which provide a straight through flow path which minimizes flow turbulance and flow resistance in either direction through the valve housing. The ball is rotated by a crank between the open and closed positions for controlling flow through the valve. Oppositely facing seat rings engage the ball on opposite sides to provide a dual redundant sealing system with the primary seals located at the upstream seat with the secondary seal formed at the downstream seat. An access plug retains the ball in the valve housing and is secured with the valve housing by a segmented locking ring. When the plug is removed from the housing maintenance or assembly access to the ball, seat rings and their retaining means without disturbing the connections of the valve housing in the flowlines is provided.

2 Claims, 1 Drawing Figure

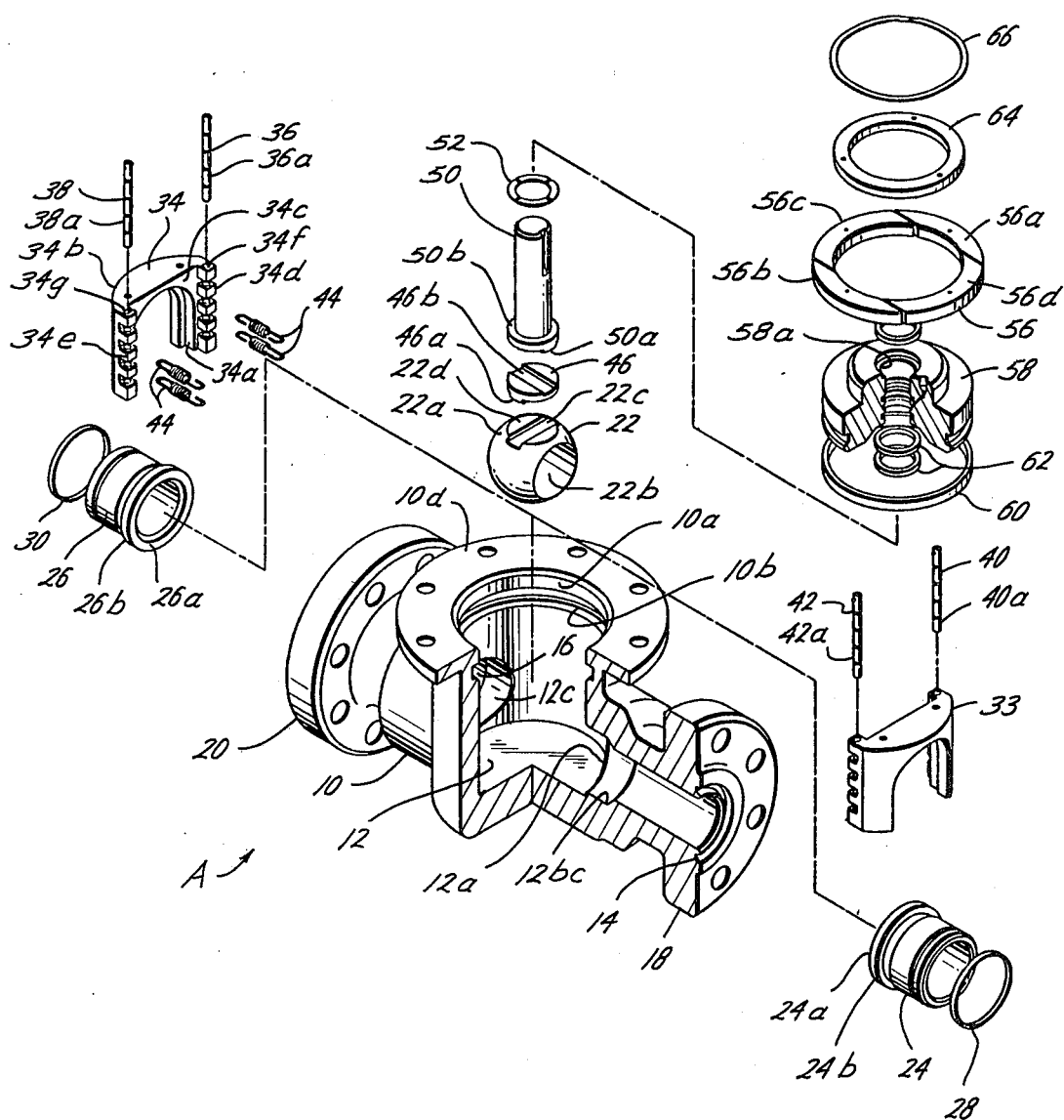

BALL TYPE VALVE HAVING IMPROVED REDUNDANT SEALING SYSTEM

TECHNICAL FIELD

This invention relates to the field of vavles for controlling flow of fluid in a conduit. In particular, the invention relates to an improved quick operating valve for use in flowlines that may be repaired in place without disturbing the flowline connections.

BACKGROUND ART

Quick acting valves using ball-type closure elements are well known. Examples of such quick response ball-type valves are disclosed in the following U.S. Pat. Nos. that are assigned to the assignee of the present invention:

2,734,715
2,863,629
2,883,146
3,035,808
3,036,590
3,064,938
3,509,913
3,589,667

While the disclosed valves have achieved numerous improvements and advantages, they, along with the other valves they exemplify, have had several limitations or drawbacks. Such limitations have related primarily to a number of features or combinations thereof and have primarily included lack of easy access to the internal components of the valve for maintenance purposes, redundant closure sealing of the flow and the capability to control flow in either direction through the valve with equal assurance.

SUMMARY OF THE INVENTION

A new and improved valve apparatus having a quick acting rotatable ball-type flow closure element disposed between a pair of seats for controlling flow through the valve in either direction is provided. A removable seal plug provides easy access to the central cavity of the valve housing for maintenance of the ball and seats without disturbing the connection of the valve in the flowline. Redundant sealing with the ball element is achieved by a pair of movable seat rings that are disposed in the valve housing to provide a straight through flow path free of flow restrictions. Spring biased retainers constantly urge the seats in sealing contact with the ball with the upstream seat providing the primary seal and the downstream seat providing the secondary seal. A mounting flange is formed on the valve housing for mounting an actuator or operator mechanism for rotating the valve crank to operate the valve.

BRIEF DESCRIPTION OF THE FIGURE

The FIGURE is an isometric exploded view of the ball-type valve of the present invention detailing the arrangement of internal parts.

BEST MODE FOR CARRYING OUT THE INVENTION

The improved valve apparatus A of the present invention having enhanced access for maintenance or assembly operations is illustrated in the FIGURE in a manner to emphasize the arrangement for assembly. As will be explained the valve apparatus A is connectable in a flowline for controlling fluid flow in the usual manner.

The valve apparatus includes a hollow valve casing or housing 10 having a central cavity 12 formed therein. The housing 10 forms at one end an inlet opening 14 for receiving flow in the cavity 12 and at the opposite end of said housing an outlet opening 16 for exhausting the flow of fluid received in the cavity 12. The cavity 12 provides a central flow path through the housing 10 along a defined longitudinal axis on which both openings 14 and 16 are disposed and which provides a straight through flow passage for minimizing flow turbulence and resistance. While the end openings 14 and 16 are described as inlet and outlet openings, respectively, it is understood that the valve apparatus A of the present invention may be used to control flow in either direction through the housing 10. Suitable means such as mounting flanges 18 and 20 are provided for connecting the apparatus A in a flow conduit (not illustrated) with inlet and outlet openings 14 and 16 communicating with the conduit for providing the passage for the flow of the fluid. The flanges 18 and 20 are provided with the circumferentially spaced bolt openings for enabling the passage of securing bolts therethrough in the usual manner.

The cavity 12 has an enlarged central portion 12a which operably receives a substantial spherical flow closure element or ball-type valve 22 therein. The ball 22 is formed with an outer spherical sealing surface 22a and a longitudinal central flow passage 22b extending therethrough. The ball 22 is rotatable between an open position in which the flow passage 22b is aligned with the longitudinal axis of the cavity 12 to provide an unrestricted flow passage through the valve 10 and a closed position with the flow passage 22b disposed traverse to the longitudinal axis of the cavity 12 for blocking flow of fluid through the valve housing 10 between the inlet 14 and outlet 16. The central flow passage is also enlarged adjacent the central cavity 12a at 12b and 12c for receiving a pair of identical valve seats 24 and 26 disposed concentrically upon the longitudinal axis of the central flow path for reciprocating movement into engagement with the centrally positioned ball 22. The seats 24 and 26 are disposed on opposite sides of the ball 22 for sealingly engagement therewith with arcuate sealing surfaces 24a and 26a in the usual manner. A pair of O-rings 28 and 30 are carried by the outer surface of the seat rings 24 and 26 for effecting a seal between the seat rings 24 and 26 and the valve housing 10 in the usual manner. The seals effected by the O-rings 28 and 30 are on a less diameter about the longitudinal axis than that established by the arcuate sealing surfaces 24a and 26a with the ball 22 in order to provide a pressure responsive urging on the seat rings 24 and 26 for pressure energizing them into greater sealing contact with the ball 22 to assist sealing at high pressure.

The seats 24 and 26 are maintained or limited against reciprocating movement away from the ball 22 by identical seat retainers 33 and 34, respectively, that engage the enlarged annular collars 24b and 26b of the seat rings 24 and 26, respectively. The seat retainer 33 is identical in construction to the retainer 34, but is reversed in position when assembled in the valve 10. For this reason only one seat retainer 34 needs to be described in greater detail. The retainer 34 forms a one ended slot 34a for receiving or mounting over the collar 26b of the seat ring 26. A rounded support surface 34b is disposed on one side of the retainer 34 for engaging the valve housing 10 to hold the retainer 34 in position in order that the recess 34a of the central opening will be properly positioned for operably locating the seat ring 26. The opposite substantially flat face, 34c, is provided with vertical ribs 34d and 34e on opposite sides of slot 34a and having longitudinally extending openings 34f and 34g formed the length of the ribs 34d and 34e. The ribs 34d and 34e are formed with a plurality of spaced interruptions along their lengths to provide access to openings 34f and 34g. The rib openings 34f and 34g receive spring mounting pins 36 and 38 having eccentric lobe sections 36a and 38a formed thereon, respectively for positioning in the rib interruption. A pair of identical spring retainer pins 40 and 42 are received in the retainer 33 in a similar manner in order that a plurality of eight springs, four of which are illustrated and referenced as 44 in the FIGURE, may be connected at the spaced locations on the pins 36, 38, 40 and 42. The springs 44 are disposed exteriorly of the ball 22 and serve to urge or maintain the seat rings 24 and 26 in sealing engagement with the ball 22. The eccentric cam lobes 36a, 38a, 40a and 42a formed on the spring retainer pins enable the springs 44 to be properly tensioned after placing the ball 22 between the seats 24 and 26 by rotation of the pins from above with a screwdriver after assembly in the housing 10 as will become more apparent.

The ball 22 is provided with an upwardly facing slot 22c formed in the upper flat surface 22d. A coupling disk 46 is provided with a downwardly facing rib 46a which engages the slot 22c for rotating the ball 22 in response to rotation of the disk 46. It being understood that the groove or slot could be formed on the disk 46 and the lug or rib on the ball 22 with equal ease while performing the same function. The coupling disk 46 is also provided with an upwardly facing slot 46b that receives a downwardly facing lug 50a formed on the upwardly extending rotatable crank or stem 50. The stem 50 forms an annular collar 50b which engages a thrust ring 52 for holding the stem or crank 50 in rotatable engagement with the coupler disk 46 and the ball 22 in the usual manner while preventing longitudinal movement from the housing 10 in a manner to be more fully described.

The housing 10 has a maintenance or assembly access opening 10a formed therein through which the ball 22, seats 24 and 26 and the retainers 32 and 34, along with springs 44, may be installed or removed. The circular opening 10a forms an annular recess 10b in the housing for receiving a quick acting segmented locking ring 56. The locking ring 56 serves to secure a central plug 58 carrying an external seal 60 in the opening 10a for sealing with the housing 10 to block leakage of fluid between the plug 58 and the housing 10. A central opening 58a of the plug 58 provides mounting clearance for the rotatable crank 50 in the usual manner while a pair of internal O-rings 62 seal between the rotatable crank 50 and the plug 58. The plug 50 also mounts the thrust bearing 52 which holds the crank 50 within the valve housing 10 while permitting its rotational movement. The plug 58 is releasably secured with the housing 10 by first installing the outer two segments 56a and 56b of the locking ring 56 in the annular groove 10b followed by the central portions 56c and 56d. The reverse sequence may be used to enable removal of the locking ring 56 components from the groove 10b which permits removal of the plug 58 and provides maintenance access through the opening 10a to the ball 22 and the seats 24 and 26 without disturbing the connection of the flange connections 18 and 20 with the flowline. To maintain the locking segments 56a, 56b, 56c and 56d in the annular recess or groove 10b, a retaining ring 64 is employed while a spiral retainer ring 66 is expanded in an annular slot (not illustrated) is used to hold the ring 64 in position. A mounting flange 10d disposed about the opening 10a provides a means whereby an actuator or operator for the valve apparatus A may be attached in the usual manner to provide for remote operation of the valve apparatus A.

Operation of the Present Invention

In the use and operation of the valve opponents A of the present invention, the valve housing 10 is mounted in a flowline using flanges 18 and 20 in the usual manner. It being understood that other end connections may also be employed to mount the valve housing 10 in the flowline without departing from the spirit of the present invention. Prior to connection of the housing 10 in the flowline the valve, apparatus A may be assembled in the manner indicated but if not, the valve internals can be assembled in the following sequence: the seat 26 and retainer 34 may be installed in the cavity 12 through the opening 10a and placed adjacent the outlet opening 16. The seat ring 24 and the retainer 32 are then moved through the opening 10a into the cavity 12 where they are positioned adjacent the inlet opening 14. In this regard it should be noted that the inlet opening 14 and the outlet opening 16 are provided with enlarged portions 14a and 16a adjacent the cavity 12 for receiving the seats 24 and 26 in order that they may reciprocate through a small range of movement along the longitudinal axis of the central flow path. The ball 22 is then installed and springs 44 attached to the retainer pins 36, 38, 40 and 42. Alternately, the springs 44 may be attached before inserting the ball 22 between the retainer 32 and 34. After the springs 44 are installed, the spring retainer pins 36, 38, 40 and 42 may be rotated in order that the eccentric lugs thereon 36a, 38a, 40a and 42a, respectively, will tension the springs 44 for holding the seats 24 and 26 in sealing engagement with the ball 22.

The coupler disk 46 is then placed in engagement with the ball 22 in order that the groove 46a will engage the slot 22c of the ball and the stem 50 is then positioned in similar engagement with the coupler disk 46. The thrust ring 52 is placed over the collar 50b and the plug 58 with O-rings 60 and 62 moved into the opening 10a for effecting its closure. With the plug 58 in sealing position in opening 10a, the segments 56a, 56b, 56c and 56d of the split lock ring are located in the annular groove 10b and secured thereto by the installation of the retaining ring 64 and 66. Manual means such as a handle may then be attached to the crank 50 for rotating the quick acting or closing ball element 22 to and from the open and closed positions as is known in the art. If desired, a valve actuator may be attached to the mounting flange 10d for effecting remote control rotation of the ball 22 by rotating the crank 50 in the usual manner.

When it becomes necessary to maintain the A, valve access can be obtained to any of the internal component parts through opening 10a by reversing the sequence of assembly.

In operation the valve apparatus A provides a dual redundant sealing system for the straight through flow passage. The primary flow passage seals are provided at the upstream seal interface of the seat 24 and ball 22 and the upstream seat 24 and body 10 seal provided by the O-ring 28. The resultant forces due to the shut-in upstream pressure are transmitted through the ball 22 to the downstream seat 24 and the retainer 34 where they are transmitted into the housing 10. This arrangement also provides a pressure differential across the ball 22 and the upstream seat 24 which loads the seal therebetween in response to the differential pressure thereacross and assures a superior seal at elevated shut-in pressures. If the primary upstream seat fails, sealing is accomplished at the downstream seat 26 and ball 22 interface and the downstream seat 26 and body 10 interfaced by the seal 30. This is accomplished by the contained fluid pressure on the ball 22 urging it against the seat 26 which is held by the retainer 34. It is understood that either seat 24 may serve as either the downstream seat or the upstream seat without affecting the operation of the valve apparatus A of the present invention as the symmetrical arrangement of the ball 22 and seats 24 and 26 permit pressurizing the valve in either direction with equal shut-off performance. The preloading contact between the ball 22 and seats 24 and 26 established by the force of the springs 44 provides a wiping action on the ball 22 as it rotates for preventing the entrance of foreign particles into the sealing interface.

The foregoing disclosure and description of the invention are illustrative and explanatory thereof, and various changes in the size, shape, and materials, as well as in the details of the illustrated construction, may be made without departing from the spirit of the invention.

We claim:

1. A valve apparatus having an improved sealing system for providing enhanced access to the valve seals for maintenance operations, including:

a valve housing having a cavity forming a central flow path defining a longitudinal axis, said central flow housing forming at one end of said flow path an inlet opening for receiving a flow of fluid and disposed at the other end of said flow path, an outlet opening for exhausting the flow of fluid, said housing having means adjacent said inlet opening and said outlet opening for connecting said housing in flow containing communication with associated flow conduits, said inlet opening and said outlet opening located on the longitudinal axis at opposite ends of housing, an access opening formed in said valve housing for enabling maintenance operations in said cavity without disconnecting said valve housing from flow containing communication with the associated flow conduits;

a substantially spherical flow closure element having a flow passage formed therethrough, said closure element disposed in said cavity forming said central flow path between said inlet and said outlet for rotational movement to and from an opened position with said flow passage aligned with said central flow path to enable flow of fluid and a closed position with said flow passage disposed transversely to said central flow path for blocking passage of fluid through said central flow path, said spherical flow closure element arranged for limited floating movement in said cavity along said longitudinal axis;

seat means disposed in said central flow path on opposite sides of and in sealing engagement with said flow closure element for blocking leakage of fluid therebetween, said seat means including a first seat ring disposed on one side of said flow closure element and a second seat ring disposed the other side of said flow closure element, said first and second seat rings concentrically positioned on the longitudinal axis and arranged for reciprocating movement therealong for maintaining sealing engagement with said flow closure element;

means disposed in said cavity operably connecting said seat rings means for retaining said seat rings in sealing engagement with said spherical flow closure element, said means for retaining being installable and removable through said access opening;

a crank extending from said valve housing and operably connected with said spherical flow closure element for providing the rotational movement to and from the open and closed positions;

a plug removably mountable within said cavity of said housing for substantially filling said access opening for enclosing said cavity, said plug having an opening through which said crank extends, said access opening dimensioned to enable passage of said flow closure element and said seat means and said means for retaining said seal rings for maintenance purposes when said plug is removed;

means for releasbly securing said plug with said housing;

means for sealing said plug with said housing to block leakage of fluid therebetween; and means for sealing between said crank and said plug to block leakage of fluid therebetween, wherein flow of fluid through said flow path is controlled;

wherein said plug removably mounted within said cavity of said housing by a segmented securing ring received in an annular groove formed by said housing, said segmented securing ring held in said annular groove by a securing ring.

2. An improved valve apparatus as set forth in claim 1, including:

a thrust washer mounted with said plug for rotatably mounting said crank to operate said spherical flow closure element.

* * * * *